United States Patent [19]

Kerr et al.

[11] Patent Number: 5,758,255
[45] Date of Patent: May 26, 1998

[54] OPPOSITE PHASE ENTRAINMENT REDUCTION IN SOLVENT EXTRACTION/ ELECTROWINNING CIRCUITS BY ADDITION OF WATER SOLUBLE CATIONIC POLYMERS

[75] Inventors: E. Michael Kerr, Aurora, Ill.; Kenneth M. Smith, II, Tucson, Ariz.

[73] Assignee: Nalco Chemical Company, Naperville, Ill.

[21] Appl. No.: 699,323

[22] Filed: Aug. 19, 1996

[51] Int. Cl.⁶ .......................... B01D 11/00; C22B 60/02; C22B 15/00; C22B 35/00
[52] U.S. Cl. .......................... 423/8; 423/9; 423/10; 423/24; 423/112; 423/DIG. 14
[58] Field of Search .................. 423/24, 112, 8, 423/9, 10, DIG. 14, 49, 54, 63, 70, 87, 99, 139, 157, 179

[56] References Cited

U.S. PATENT DOCUMENTS

| | | |
|---|---|---|
| 3,428,449 | 2/1969 | Swanson . |
| 3,655,347 | 4/1972 | Mattison et al. . |
| 4,402,920 | 9/1983 | Lopez et al. .................. 423/8 |
| 4,507,268 | 3/1985 | Kordosky et al. . |
| 4,544,532 | 10/1985 | Kordosky et al. . |
| 4,875,935 | 10/1989 | Gross et al. . |
| 5,024,821 | 6/1991 | Greenshields et al. . |

OTHER PUBLICATIONS

"Technical Innovations Spur Resurgence of Copper Solution Mining", J. B. Hiskey, *Mining Engineering*, pp. 1036–1039, Nov., 1986.

"Evaluation of Copper Dump and Heap Leaching Situations", J.M. Keane & C. K. Chase, *Mining Engineering*, pp. 197–200, Mar. 1987.

*Primary Examiner*—Steven Bos
*Attorney, Agent, or Firm*—Thomas M. Breininger; Kelly L. Cummings

[57] ABSTRACT

A method of reducing the entrainment of aqueous mineral acid solutions in organic extractants used in the solvent extraction of metals from the aqueous fluid is disclosed. The method comprises adding an effective, entrainment prevention amount of a water soluble cationic polymer having a molecular weight of from about 10,000 to about 500,000 to a metal rich aqueous mineral acid solution, immediately prior to, or during mixing with a metal poor organic extractant, and then recovering a metal poor aqueous mineral acid phase, and a metal rich organic extractant phase having a reduced level of entrainment of the aqueous mineral acid solution. In a preferred embodiment the metal is copper, and the polymer is poly (diallyldimethylammonium) chloride.

5 Claims, No Drawings

OPPOSITE PHASE ENTRAINMENT REDUCTION IN SOLVENT EXTRACTION/ ELECTROWINNING CIRCUITS BY ADDITION OF WATER SOLUBLE CATIONIC POLYMERS

FIELD OF THE INVENTION

The invention is a method for the improvement in the quality of electroplated metals, and preferably copper produced in a system wherein a metal containing substrate is leached with an aqueous mineral acid to produce a metal rich aqueous mineral acid phase, the metal rich aqueous mineral acid phase is then contacted with an organic extractant phase to remove metal selectively from the aqueous mineral acid phase, the extractant phase is then treated with an aqueous phase to remove metal from the organic phase, and the resultant aqueous phase is used as the feed to an electroplating process.

The improvement of the instant invention comprises adding to the metal rich aqueous mineral acid phase immediately prior to or during mixing with a metal poor organic extractant phase an effective aqueous entrainment reducing amount of a water soluble cationic polymer having a molecular weight of from about 10,000 to about 500,000 whereby the amount of aqueous mineral acid phase entrained in the organic extractant phase is reduced.

Through the use of this invention entrained aqueous phase impurities in the organic extractant phase such as iron, aluminum, magnesium and other metal components are reduced, with the resultant benefit that higher purity aqueous electroplating feed is produced. The method of the invention is particularly useful in solvent extraction processes for the recovery of copper, uranium and beryllium.

BACKGROUND OF THE INVENTION

Solvent extraction (SX) is applicable in any instance where it is desirable to selectively remove or extract a species from one solution into another. This can apply either to the removal of a valuable component from contaminants or to the removal of contaminants from the valuable component. The solution originally containing the desired species and the solution into which this species or the contaminants are to be extracted must be immiscible to effect separation.

In metal recovery operations, the desired component is normally a metal ion or a metal ion complex contained in an aqueous solution. This aqueous solution is mixed with an immiscible organic phase containing the active extractant at which time the active extractant transfers the desired metal from the aqueous into the organic phase. The organic metal rich extractant phase and the metal poor aqueous phases are then separated. The loaded organic, or metal rich phase, now containing the extracted metal, is then transferred from the extraction section to a stripping section where the extracted metal is stripped from the organic phase. The stripped organic is then recycled back to extraction.

In most instances, stripping is done with an aqueous solution from which final metal recovery takes place. The recovery of metal directly from the loaded organic phase is also possible, but, is not currently in commercial use. Because this process resembles metal extraction with solid ion exchange resins, it is often called liquid ion exchange.

Because the original aqueous phase which contacts the metal containing substrate is normally a mineral acid which dissolves metallic and non-metallic impurities in addition to the desired metal, entrainment of the aqueous phase in the organic extractant phase is undesirable from both the perspectives of lost aqueous phase which can be recycled, lost organic extractant phase, and often most importantly the inclusion of undesirable metallic impurities in the organic extractant phase which are then extracted from the organic phase, and passed along to the metal electrowinning or electroplating circuit. While this invention is applicable in general to the solvent extraction process for all metals, it has been found to be particularly applicable to processes in which copper, uranium and beryllium are recovered, and most particularly copper through solvent extraction.

By way of illustration, and not of limitation the following description is given for copper ore. Those skilled in the art will note that the processes exemplified and described herein may be used in the organic extraction process for other metals including but not limited to uranium and beryllium.

Copper can be extracted from "oxide" copper minerals such as malachite, azurite, chalcocite, chrysocolla, and cuprite (substrates) by heap leaching with sulfuric acid. In this method, ore is crushed to about −1", agglomerated with 20–60 lb./ton concentrated sulfuric acid, and stacked to 10–30 ft. depth. Dilute sulfuric acid (20 g/l) is then sprayed onto and allowed to percolate down through the heap. During the percolation, copper is dissolved as $CuSO_4$. Solution is drawn off at the bottom of the heap for further processing. This now copper rich mineral acid solution is contacted with an organic extractant. During mixing the copper contained in the mineral acid extracts to the organic extractant resulting in the formation of a copper rich organic extractant and a copper poor aqueous mineral acid phase. These phases are separated, and the aqueous mineral acid phase is recycled to the copper ore or substrate, while the copper rich organic extractant phase is stripped of metal content with an aqueous phase, to produce a second copper rich aqueous phase which is then used as the feed for electroplating or electrowinning. If all of the aqueous mineral acid phase is not cleanly removed from the organic extractant phase, the entrained mineral acid carrying other metals and impurities may be treated by the second aqueous phase as well, resulting in the inclusion of impurities in the electrowinning feed. It is accordingly desirable to completely and thoroughly separate the mineral acid phase from the organic extractant phase. It is to this separation that the improvement of this invention is directed, the reduction of aqueous mineral acid phase entrainment into the organic extractant.

A further description of the heap leaching of copper ores may be found in the following two articles: "Technical Innovations Spur Resurgence of Copper Solution Mining", J. B. Hiskey, *Mining Engineering*, pg. 1036–1039, November 1986, and "Evaluation of Copper Dump and Heap Leaching Situations", J. M. Keane and C. K. Chase, *Mining Engineering*, pg. 197–200, March 1987.

A major problem in the heap leaching of ores is the segregation of the fines in building the heap and migration of fines during percolation which results in channeling of the leach solution and/or blinding of the heap. Blinding and channeling will cause dry areas in the heap giving low recovery of copper. The process of agglomeration of the crushed ore can be aided by spraying a high molecular weight anionic acrylamide polymer in dilute sulfuric acid or water solution onto tumbling ore to bind the fines and prevent the above problem, as disclosed in U.S. Pat. No. 4,875,935. Nonionic and cationic polymers have also been used for the same purpose.

It has been found that modifiers will not only influence the strength of the extraction, but can also effect the hydrolytic stability and the selectivity of extraction of the desired metal over other, undesired, metals present in the initial aqueous phase. Other factors which can be affected are the level of entrainment of one phase in the other, for example of organic phase in aqueous phase, the kinetics of the extraction and stripping stages and the generation of crud (emulsion or mixture interface often containing portions of the aqueous phase, organic phase, and solids). A suitable modifier will therefore often be the result of a compromise.

In solvent extraction operations employing banks of mixer settlers operated in a continuous fashion, it is inevitable that after the primary separation of the organic and aqueous phases in the settlers, there remains some entrainment of one phase in the other. This entrainment is in the form of minute droplets that are very slow to coalesce or settle and are thus carried through with the primary phase. In the case of droplets of organic material which are entrained in the aqueous phase, this represents a major loss of the extraction reagent from the plant, both in organic material entrained in the discarded raffinate from the extraction circuit and in aqueous material transferred to the electrolyte in the stripping state. In the latter case, the entrained aqueous material may cause further complications by interfering with the clean deposition of copper and may cause burning of the electrodes. In the case of entrainment of droplets of aqueous in organic phase, this represents a means of physical transfer of unwanted metals such as iron present in the aqueous feed solution, that may outweigh the advantages of the high selectivity of an extractant reagent for the desired metal values over other metals. It is therefore very desirable to maintain entrainment at as low a level as possible. Various physical means may be used to try to minimize entrainment and it has been found that the reagent compositions employed can have an effect on entrainment levels. Thus, there are distinct advantages in reagents which minimize formation of entrainment of one phase in another.

Specifically, the reduction of the aqueous in organic entrainment with chemical additives greatly improves the quality of the electroplated copper in the electrowinning stage of SX/EW. By preventing the aqueous mineral acid phase from entraining in the organic extractant phase, the transfer of undesirable Fe, Mg, Al, Mn and Ca ions is reduced. These ions are detrimental to the electroplating process and to resultant metal quality. By reducing the opposite phase entrainments, both product quality and process throughput may be greatly enhanced. Further, reduction of the organic in aqueous entrainment leads to the reduction of the loss of extraction agent raw materials.

Among the extractants typically used for copper metal are 2-hydroxyaryloxime which is disclosed as an extracting agent for the solvent extraction process for the recovery of a metal from an aqueous solution in U.S. Pat. No. 5,024,821. Reagents formulated by admixture of selected hydroxy aryl ketoxime and hydroxy aryl aldoxime extractants which provide for efficient recovery of copper in the solvent extraction process are disclosed in U.S. Pat. No. 4,544,532 and U.S. Pat. No. 4,507,268. Substituted 2-hydroxy benzophenoximes alone or in combination with certain alphahydroxy aliphatic oximes are disclosed for the enhancement of the recovery of copper from an aqueous solution in U.S. Pat. No. 3,428,449 and U.S. Pat. No. 3,655,347. Therefore, the conventional techniques for enhancing the solvent extraction process for recovery of copper involve small molecules which contain oxime functionalities. This invention is not believed to be specific to any particular type of organic extractant, and it is not within the scope of this disclosure to propose specific organic extractants which are specific for specific metals.

There remains a need however for a process which can be used for metal extraction and which reduces entrainment. It is accordingly an object of this invention to reduce the amount of aqueous mineral acid phase which is entrained in an organic extractant phase after contacting a rich metal content mineral acid phase with a poor metal content organic extractant phase to produce a poor metal content mineral acid phase and a rich metal content organic extractant phase. It is a further object of this invention to improve the purity of electrowinned metals produced using aqueous feeds from solvent extraction processes. It is a still further object of this invention to decrease the amount of aqueous mineral acid phase entrainment in organic extractant processes used for the preparation of aqueous electrowinning feed streams. It is yet a further object of the invention to prepare an organic metal rich extractant phase containing reduced levels of entrained aqueous mineral acid phase. It is an additional object to improve methods used for the organic extraction recovery of metals by decreasing aqueous entrainment in the organic extraction.

Further objects will appear hereinafter.

SUMMARY OF THE INVENTION

In its broadest sense the invention described herein is an improvement in a method for the recovery of metals wherein:

a. a metal bearing substrate is contacted with an aqueous mineral acid such a sulfuric, hydrochloric, phosphoric, preferably sulfuric or the like to produce a metal rich aqueous mineral acid phase;

b. the metal rich aqueous mineral acid is mixed with an organic metal extractant to produce a metal poor aqueous mineral acid phase and a metal rich organic extractant phase;

c. the metal poor aqueous mineral acid phase is recovered and recycled, and the metal rich organic extractant phase is processed to recover metal content; the improvement comprising adding to the metal rich aqueous phase immediately prior to or during mixing with the metal poor organic extractant phase an effective aqueous entrainment reducing amount of a water soluble cationic polymer having a molecular weight of from about 10,000 to about 500,000 whereby the amount of aqueous mineral acid phase entrained in the organic extractant phase is reduced. In a preferred aspect of this invention the metal is copper.

DESCRIPTION OF THE INVENTION

The invention is an improvement to a method in a metals, and preferably copper, extraction entrainment-reduction process wherein a metal rich aqueous mineral acid solution, preferably a dilute sulfuric acid solution of the metal is contacted with a metal poor organic extractant specific for the metal thereby producing a metal rich organic extractant metal phase in contact with a metal poor aqueous mineral acid phase, and then separating the phases wherein the improvement comprises the steps of: adding to the metal rich aqueous phase immediately prior to or during mixing with the metal poor organic extractant phase an effective aqueous entrainment reducing amount of a water soluble cationic polymer having a molecular weight of from about 10,000 to about 500,000 whereby the amount of aqueous mineral acid phase entrained in the organic extractant phase is reduced.

The water-soluble cationic polymer may be selected from any number of known water soluble cationic polymers. The polymers may be vinyl addition polymers such as poly (diallyldimethylammonium) chloride (poly (DADMAC)), acrylamide-diallyldimethylammonium chloride copolymers, poly(diallyldimethyl ammonium chloride/ dimethylaminoethyl acrylate benzyl chloride quaternary), polymers and copolymers of dimethylaminoethylacrylate methyl chloride and benzyl chloride quaternaries, dimethylaminoethylmethacrylate, dimethylaminoethyl-methacrylate quaternaries, copolymers of diallyldimethy-lammonium chloride with anionic monomers such as acrylic acid, and methacrylic acid, copolymers of diallyldimethy-lammonium chloride with hydrophobic monomers such as vinyl trimethyl siloxane, fatty acid quaternaries of dimethylaminoethylacrylate, and dimethylaminomethacrylate, and poly(diallyldimethyl ammonium chloride/dimethylaminoethyl acrylate methyl chloride quaternary) or may be condensation polymers such as epichlorohydrin-dimethylamine, ephichlorohydrin-dimethylamine-ammonia, ethylenedichloride ammonia, or any of the various polyamine or polyethyleneimine materials. The polymers of this invention may contain in addition to cationic functionality anionic or non-ionic moieties. The cationic water soluble polymers of the invention may be copolymerized with hydrophobic monomers such as vinyl trimethyl siloxane, so long as the resultant polymer remains water soluble. As can be seen, all that is important is that the polymer carry a cationic charge, be water soluble or dispersible, and partition into the aqueous fluid and not the organic extractant. The water soluble cationic polymers useful in this invention have a molecular weight ranging from as low as about 5–10,000 to as high as about 500,000. Preferably the polymers will have a molecular weight ranging from about 10,000 to about 250,000. Cationic polymers in this range are generally classified by industry as coagulant type materials. In a preferred aspect of this invention the polymer is poly (diallyldimethylammonium) chloride having a molecular weight of from about 100,000 to about 500,000, and most preferably from about 100,000 to about 250,000.

The polymers are added to the aqueous mineral acid phase at a level to be effective in preventing the entrainment of the aqueous phase in the organic extractant material. Depending on the polymer dosage may vary from as little as a few ppm based on the aqueous mineral acid phase, or may range to several hundred ppm or more. Dosage of the polymer is not critical, and the appropriate dosage is readily determinable for a particular polymer and a particular aqueous phase and extractant combination through routine trial and error experiments. Generally the polymer is added at a rate of from 0.5 ppm to 5 ppm.

The following examples are presented to describe preferred embodiments and utilities of the invention and are not meant to limit the invention unless otherwise stated in the claims appended hereto.

EXAMPLE 1

Testing was performed at a Southwestern copper processing facility. Testing was performed in the continuous liquid ion exchange unit of the copper SX/EW (solvent extraction/ electrowinning) circuit. The unit consists of a series of extractors followed by a series of strippers in the organic recycle stream. After the first extraction, where barren aqueous raffinate may be drawn off, the solution was sampled for the determination of how much organic liquid was present in the aqueous phase (Sampling Point A). After the stream passes through the complete series of extractors, the amount of aqueous solution in the organic phase was sampled.

The polymer was first added to the PLS feed line (Application Point 1), at a point in the processing stream approximately 1.5 miles back from the extractor unit, the location where polymer is conventionally added for the purpose of coagulating solids from the metal rich aqueous mineral acid phase. The process stream was sampled at each of 2 extractor trains which run in parallel in the continuous liquid ion exchange unit.

To determine the amount of aqueous entrainment in the organic phase, a 100 ml graduated oil bottle was filled with liquid drawn from the stream at Sample Point A. Test solutions were then centrifuged at 2000 rpm for 10 minutes. The amount of water was determined by reading graduations on the side of the bottle.

A more efficient extraction means that less water will be present in the process stream to be recycled. Therefore, lower ppm water indicates greater efficiency for the polymer tested. The results in Table 1 show that upon addition of 160 cc/min of poly(DADMAC) having a molecular weight of approximately 100,000 immediately after contact with the substrate for the purpose of coagulating fines in the mineral acid stream, a large amount of water remains in the process stream.

By contrast, when 70 cc/min of poly(DADMAC) having a molecular weight of approximately 100,000 is added directly to the mineral acid solution immediately prior to contacting the acid with the extractant, or to the extractor mixer [Point 2] which is within the extraction portion of the solvent extraction process, a surprising result is obtained. Upon addition of less than half of the amount dosed at Sample Point 1, much smaller residual amounts of water were measured, as illustrated in Table 1.

Table I illustrates that cationic polymers added at other locations for the purposes of crud control do not ameliorate problems associated with the aqueous in organic entrainment. Rather, by adding the cationic polymer to the extractor mix box in the production circuit where the droplets of water in the organic phase and organics in the aqueous phase are generated in the copper extraction circuit, the treatment is added at a location where it has maximal effectiveness, at the source of the problem. Therefore this invention is surprisingly effective for by this method, the entrainment of water in organic phase was reduced by approximately 90%.

TABLE I

Determination of Amount of Water in Organic Phase

| Polymer[1] Dosage (cc/min) | Application Point | $H_2O$ (ppm) | | | |
|---|---|---|---|---|---|
| | | Extractor 1A | Extractor 1A | Extractor 1B | Extractor 1B |
| 0 | 1 | 0 | 100 | 200 | 100 |
| 0 | 1 | 200 | 200 | 100 | 100 |
| 0 | 1 | 600 | 200 | 200 | 50 |
| 0 | 1 | 200 | 300 | 100 | 100 |
| | | E1A Avg | 225.00 E1B Avg | | 118.75 |
| 0 | 1 | 100 | 200 | 100 | 200 |
| 0 | 1 | 100 | 300 | 100 | 100 |
| 0 | 1 | 200 | 100 | 50 | 100 |
| 0 | 1 | 600 | 400 | 100 | 300 |
| 0 | 1 | 50 | 100 | 200 | 150 |
| 0* | 1 | 250 | 100 | 100 | 200 |
| | | E1A Avg | 208.33 E1B Avg | | 141.67 |
| 160 | 1 | 250 | 250 | 250 | 300 |
| 160 | 1 | 300 | 200 | 400 | 350 |
| 160 | 1 | 200 | 100 | 400 | 200 |
| 160 | 1 | 300 | 50 | 300 | 500 |
| 160 | 1 | 200 | 100 | 50 | 50 |

TABLE I-continued

Determination of Amount of Water in Organic Phase

| Polymer[1] Dosage (cc/min) | Application Point | H₂O (ppm) Extractor 1A | Extractor 1A | Extractor 1B | Extractor 1B |
|---|---|---|---|---|---|
| 160 | 1 | 50 | 400 | 50 | 600 |
| 160 | 1 | 500 | 100 | 50 | 50 |
| 160 | 1 | 150 | 400 | 300 | 400 |
|  |  | Avg E1A | 221.88 | Avg E1B | 265.63 |
| 70 | 2 | 0 | 0 | 0 | 0 |
| 70 | 2 | 0 | 0 | 0 | 100 |
| 70 | 2 | 0 | 0 | 100 | 50 |
| 70 | 2 | 0 | 0 | 0 | 100 |
| 70** | 2 | 50 | 0 | 0 | 100 |
|  |  |  |  | Avg | 25 |
| 0 | 2 | 200 | 200 | 100 | 0 |
| 0 | 2 | 300 | 100 | 0 | 100 |
| 0 | 2 | 100 | 300 | 0 | 150 |
| 0 | 2 | 0 | 300 | 50 | 200 |
| 0 | 2 | 0 | 500 | 200 | 100 |
|  |  |  |  | Avg | 145 |

[1] = polymer = solution poly (DADMAC), 20% actives

Changes can be made in the composition, operation and arrangement of the method of the present invention described herein without departing from the concept and scope of the invention as defined in the following claims:

We claim:

1. In a method for the recovery of metal wherein:
   a. a metal bearing substrate is contacted with an aqueous mineral acid to produce a metal rich aqueous mineral acid;
   b. the metal rich aqueous mineral acid is mixed with an organic metal extractant to produce a metal poor aqueous mineral acid phase and a metal rich organic metal extractant phase containing entrained metal poor aqueous mineral acid phase;
   c. the metal rich organic metal extractant phase is stripped to recover metal content; the improvement comprising adding to the metal rich aqueous mineral acid immediately prior to or during mixing with the organic metal extractant a water soluble cationic polymer having a molecular weight of from about 10,000 to about 500,000 in an amount effective to reduce the amount of aqueous mineral acid phase which is entrained in the metal rich organic metal extractant phase.

2. The improvement of claim 1 wherein the metal is copper.

3. The improvement of claim 1 wherein the water soluble cationic polymer is poly(diallyldimethylammonium) chloride and wherein the metal is copper.

4. The improvement of claim 1 wherein the metal is beryllium.

5. The improvement of claim 1 wherein the metal is uranium.

* * * * *